United States Patent [19]

Muhr et al.

[11] Patent Number: 4,685,365
[45] Date of Patent: Aug. 11, 1987

[54] PROFILE-BAR CUTTER WITH ANGLED BLADE MOVEMENT

[75] Inventors: Richard Muhr, Attendorn; Werner Schröder, Finnentrop, both of Fed. Rep. of Germany

[73] Assignee: Muhr und Bender, Attendorn, Fed. Rep. of Germany

[21] Appl. No.: 770,684

[22] Filed: Aug. 29, 1985

[30] Foreign Application Priority Data

Sep. 5, 1984 [DE] Fed. Rep. of Germany ....... 3432546

[51] Int. Cl.⁴ ............................................. B23D 23/00
[52] U.S. Cl. ........................................ 83/198; 83/197; 403/263
[58] Field of Search ................... 83/196–198, 83/821; 308/3 A, DIG. 9, 241; 384/907; 403/263

[56] References Cited

U.S. PATENT DOCUMENTS

| | | | |
|---|---|---|---|
| 2,728,391 | 12/1955 | Peddinghaus et al. | 83/198 |
| 3,391,591 | 7/1968 | Funke | 83/197 |
| 3,750,509 | 8/1973 | Kruse | 83/198 |
| 3,885,837 | 5/1975 | Mellor | 308/3 A X |
| 4,067,252 | 1/1978 | Peddinghaus et al. | 83/198 X |
| 4,358,214 | 11/1982 | Shull | 403/263 X |
| 4,435,839 | 3/1984 | Gu et al. | 308/DIG. 9 |
| 4,457,197 | 7/1984 | Wepner et al. | 83/198 X |

Primary Examiner—Donald R. Schran
Attorney, Agent, or Firm—Browdy & Neimark

[57] ABSTRACT

An angle shear for cutting profile steel has generally parallel and spaced front and rear frame plates fixed relative to each other, at least one fixed blade carried on the front plate, a working slide displaceable vertically between the frame plates, and individual guide rails extending at an acute angle of generally 45° to the vertical and secured to one of the frame plates. An angle slide displaceable along the guides generally at 45° to the vertical between the plates carries a movable blade displaceable past the fixed blade. Formations link the slides for joint synchronous movement between the plates. Both slides move in generally the same plane and have front and rear faces directly confronting and engaging the front and rear plates, respectively.

6 Claims, 2 Drawing Figures

PROFILE-BAR CUTTER WITH ANGLED BLADE MOVEMENT

FIELD OF THE INVENTION

The present invention relates to a shear for cutting profile steel stock. More particularly this invention concerns such a shear where the cutting action moves at an acute angle to the vertical.

BACKGROUND OF THE INVENTION

In the cutting of profile stock, most typically L-section angle iron, it is necessary to attack the material in a direction not parallel to either of the flanges of the angle iron. The standard shear comprises, however, a vertically moving blade plate that carries a movable blade and that is sandwiched between two massive upright frame plates carrying a fixed blade. Typically the frame plates are formed with one or more throughgoing ports through which material is engaged to cut it. In the simplest such arrangement as shown in German patent 2,838,733, angle iron is positioned in the shear with its two flanges diverging oppositely upward and is then cut with the vertically moving blade.

Such an arrangement does not fit into standard production lines, because in such lines the angle iron is invariably sitting with one of its flanges horizontal and the other vertical. To avoid having to tip the workpiece to cut it, an arrangement is suggested in U.S. Pat. No. 2,728,391 wherein the profile-cutting blade is carried on a secondary or angle blade slide that moves in the frame at an angle of about 45° to the vertical.

To this end the front frame plate is formed with a window having edges extending at the 45° angle and forming guide surfaces for the angle blade slide. Force is transmitted from the working slide to the angle slide by a bar projecting from the working slide and cooperating with a pin projecting from the working slide which pulls back the angle slide when the working slide is lifted after a cut. The angle slide thus does not lie in the same plane as the working slide but in a plane between that of the working slide and that of the front frame plate. The position of the movable blade relative to the stationary blade is established by the working slide. The angle slide is held against the front frame plate by the working slide.

Considerable force must be transmitted via the guide surfaces formed in the front plate. This element is typically made of a steel that has poor wear properties, so that problems are frequently encountered with the angle slide. In addition the force transmission from the working-slide plane to the angle-slide plane creates transverse stresses in the frame that serve no useful function and that, in fact, can lead to damage of the shear. Accordingly these plates must be massive to withstand these transverse forces.

OBJECTS OF THE INVENTION

It is therefore an object of the present invention to provide an improved angle shear.

Another object is the provision of such an angle shear which overcomes the above-given disadvantages, that is which has a rationally and efficiently arranged secondary blade guide.

SUMMARY OF THE INVENTION

An angle shear for cutting profile steel has generally parallel and spaced front and rear frame plates fixed relative to each other, at least one fixed blade carried on the front plate, a working slide displaceable vertically between the frame plates, and individual guide rails extending at an acute angle of generally 45° to the vertical and secured to one of the frame plates. An angle slide displaceable along the guides generally at 45° to the vertical between the plates carries a movable blade displaceable past the fixed blade. Formations link the slide for joint synchronous movement between the plates. Both slides move in generally the same plane and have front and rear faces directly confronting and engaging the front and rear plates, respectively.

Thus these guides and slide surfaces are formed on structure that is specifically designed for this function. It is not necessary to make them of the same material as the front and rear plates. In addition it is possible to mount the angle slide not in a window in one of the plates, but in a window of the working slide between the two plates. As a result force transmission lies in the same vertical plane, for higher efficiency and less strain on the frame of the machine.

According to another feature of this invention the rails are of a material with a lower coefficient of friction than the plates. This material normally includes graphite. The front and rear plates are normally made of mild steel and the blades are formed of a harder steel.

The rails in accordance with this invention bridge and are fastened to both of the plates. More particularly, the front plate is formed flanking the fixed blade with rearwardly open grooves and the rails have front edges seated in the grooves. Bolts secure the rails to the front plate. Furthermore, the rails are formed with respective guide shoulders forwardly engaging the movable blade and have rear edges formed with lateral projections forwardly engaging the rear plate. Thus the working slide can be taken out through the window in the front plate, as can the fixed blade, all without removing the guide rails.

DESCRIPTION OF THE DRAWING Description of the Drawing

The above and other features and advantages will become more readily apparent from the following, reference being made to the accompanying drawing in which.

SPECIFIC DESCRIPTION

Figures 1, 2:
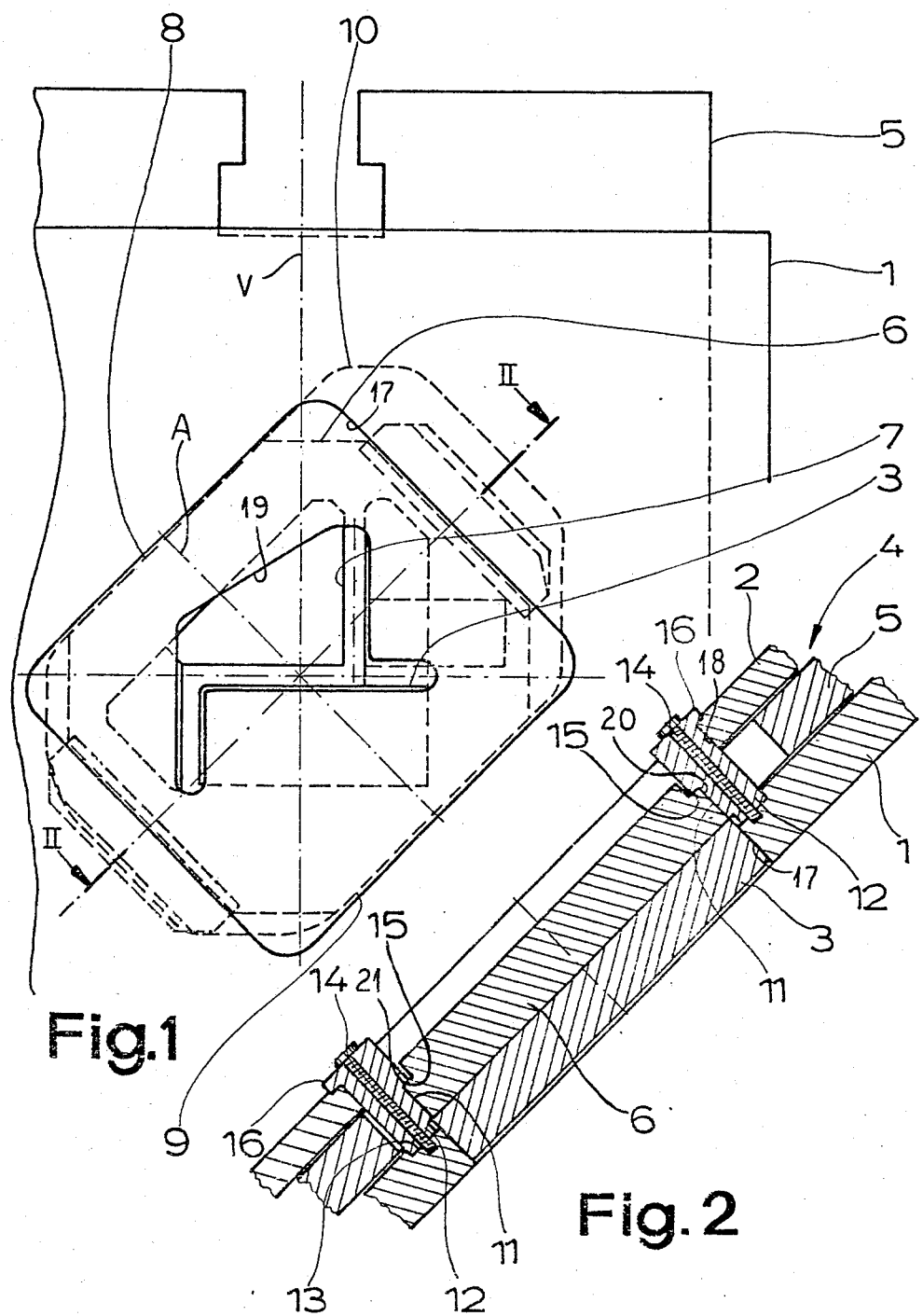
FIG. 1 is front view of a detail of a shear according to this invention.
FIG. 2 is a section taken along line II—II of FIG. 1.

As seen in the drawing the shear according to this invention comprises a relatively thick and vertical front plate 1 and a thinner back plate 2 offset from but parallel to the plate 1 so as to define a vertically extending central space 4. A slide 5 is vertically displaceable in the space 4 along a vertical axis V. The front and back plates 1 and 2 are formed with respective horizontally aligned windows or ports 17 and 18 of rounded-corner rectangular shape with sides edges extending parallel and end edges extending perpendicular to an axis A extending at 45° to the axis V. The cutout 17 is fitted with a fixed blade 3 in turn having a central throughgoing hole 19 through which a workpiece to be cut is fitted.

The work slide 5 is formed aligned with the windows 17 and 18 with a somewhat larger window 10 having an upper angled surface 8 and a lower angles surface 9. An angle slide 6 is received with slight play between the surfaces 8 and 9 in the cutout 10. This slide 6 has side edges 20 extending perpendicular to the edge surfaces 8 and 9 and riding on complementary surfaces 11 of graphite-material guide rails 12 bridging the plates 1 and 2 and extending perfectly parallel to the axis A. This angle slide 6 carries a blade 7 that can move past the blade 3 to cut a profile workpiece sitting on it with its flanges vertical and horizontal. This is done when the slide 5 drops vertically along the axis V and pushes with its upper angle surface 8 against the upper end edge of the slide 6, converting the vertical motion of the slide 5 into angled motion of the slide 6. Thus the vertical and horizontal flanges of the profile workpiece being chopped will be attacked at an angle and accurately cut. When the slide 5 is lifted, it will push the slide 6 back up along its axis A by means of its surface 9.

According to this invention these rails 12 have front edges set into grooves 13 formed on the back face of the front plate 1 along the side edges of the window 17. The rear ends of the rails 12 have lateral projections 16 that engage over the rear face of the rear plate 2 at the side edges of the aperture 18. Bolts 14 pass through the guide rails 12 from the rear to secure them to the plate 1 and simultaneously secure the plates 1 and 2 together at the windows 17 and 18. In addition the rails 12 are formed with forwardly directed shoulders 15 that engage backwardly directed shoulders 21 of the angle slide 6, rearwardly confining and guiding this slide 6 which is forwardly confined and guided by the blade 3 and plate 1. The angle slide 6 and its blade 7 are in the same plane in the space 4 as the slide 5, so that there will be no transverse front-to-back forces tending to separate the plates during shearing.

It is therefore possible to remove and replace the blade 3 from the front of the machine, and even to remove and replace the slide 6 and/or blade 7, without taking off the rails 12. This ease of servicing makes it easy to change blades for different workpieces or to replace them when they get dull. Similarly it is possible to take off and replace the guide rails 12 from the back of the machine without otherwise disassembling the equipment.

We claim:

1. An angle shear for cutting profile steel, the angle shear comprising:

generally parallel, vertical, and spaced front and rear frame plates fixed relative to each other and formed with respective horizontally aligned workpiece windows, the front plate being formed with a pair of parallel rearwardly open grooves flanking the front window and extending at an acute angle of generally 45° to the vertical, the rear window being wider measured perpendicular to the grooves than the front window;

at least one fixed blade carried on the front plate at the front window between the grooves;

a working slide displaceable vertically between the frame plates generally at the windows;

guide rails having front edges seated in the rearwardly open grooves and rear edges projecting rearwardly past the rear plate, the guide rails forming force-transmitting shoulders at the front plate as well as at the rear plate, those shoulders abutting corresponding force-transmitting shoulders formed by the sides of the grooves and the sides of the rear window, the guide rails further extending at the acute angle of generally 45° to the vertical and being secured to at least one of the frame plates at the respective window;

an angle slide displaceable along the guide rails generally at 45° to the vertical between the plates and carrying a movable blade displaceable past the fixed blade; and formations linking the slides for joint synchronous movement between the plates in generally the same vertical plane.

2. The shear of claim 1, wherein said fixed blade is removable from the front side of the angle shear from which said front plate is accessible, without removing said guide rails.

3. The shear of claim 1, wherein said rails and/or said angle slide are removable from the rear side of the angle shear from which said rear plate is accessible, without removing said fixed blade.

4. The shear of claim 2, wherein said rails and/or said angle slide are removable from the rear side of the angle shear from which said rear plate is accessible, without removing said fixed blade.

5. The shear of claim 1, wherein said guide rails are removable from the rear side of the angle shear from which said rear plate is accessible, without removing said fixed blade and said angle slide.

6. The shear of claim 2, wherein said guide rails are removable from the rear side of the angle shear from which said rear plate is accessible, without removing said fixed blade and said angle slide.

* * * * *